United States Patent [19]
Hohwart et al.

[11] 3,833,229
[45] Sept. 3, 1974

[54] PIN ARBOR

[75] Inventors: George Hohwart, Howell; Paul Toth, Allen Park, both of Mich.

[73] Assignee: N.A. Woodworth Company, Detroit, Mich.

[22] Filed: Jan. 10, 1973

[21] Appl. No.: 322,292

[52] U.S. Cl. .......................... 279/1 J, 279/2, 279/60
[51] Int. Cl. ...................... B23b 31/12, B23b 31/40
[58] Field of Search ........... 279/2, 1 J, 1 L, 1 R, 60, 279/65; 269/138

[56] References Cited
UNITED STATES PATENTS
3,633,929    1/1972    Morawski .............................. 279/2

*Primary Examiner*—Gil Weidenfeld
*Attorney, Agent, or Firm*—Harness, Dickey & Pierce

[57] ABSTRACT

A workpiece-supporting arbor having a body with circumferentially spaced inclined pins the outer ends of which are engageable with the workpiece. A disc-shaped pin actuator connected to a draw-bar has slots through which the pins extend, the pins having shoulders engageable by this actuator during operation. The pins are removable from the front of the body by application of a tool such as a screwdriver and rotation of the pins. Locating surfaces on the pins permit proper re-insertion, the surfaces being so shaped as to permit pin adjustment for workpiece irregularities. The pins have sufficient cross-sectional area in the portions straddled by the actuator slots to provide ample tensile strength during operation.

8 Claims, 6 Drawing Figures

PIN ARBOR

BACKGROUND OF THE INVENTION

1. Field of the Invention

The invention relates to pin arbors of the type having slidable inclined pins in a body mounted on a spindle, with a drawbar attachment actuating the pins so that their outer ends may engage a workpiece to be held for machining or inspection.

2. Description of the Prior Art

Pin arbors of this general nature is shown in Morawski et al. U.S. Pat. No. 3,633,929 dated Jan. 11, 1972, and references cited therein. This prior art has certain drawbacks which the present invention overcomes, as will become apparent from the description.

BRIEF SUMMARY OF THE INVENTION

It is an object of the invention to provide a novel and improved pin arbor which has the required strength for proper workpiece gripping and does not create unbalanced forces on the pins during operation.

It is a further object to provide an improved pin arbor of this type which permits easy and rapid removal and replacement of the pins so that different sizes of workpieces may be carried, by the simple use of a hand tool such as a screwdriver.

It is also an object to provide an improved pin arbor of this nature which includes safety stops when reassembling the pins so as to assure their proper mounting.

It is another object to provide an improved pin arbor of this type in which allowance is made for slight irregularities in the workpieces, thus assuring proper gripping during operation.

Briefly, the illustrated embodiment of the invention comprises a body mountable on a spindle, a plurality of circumferentially spaced pins slidably mounted in the body and inclined with respect to the body axis, a drawbar member comprising a pin actuator having radially extending portions which straddle necked-down portions of the pins, and means on externally accessible portions of the pins to which a hand tool can be applied so that the pins may be removed from the body.

As illustrated, the straddled portions of the pins are of generally circular cross-section except that opposite corners have extensions engageable with the walls of the pin actuator slots when the pins are assembled. These extensions thus provide safety stops when assembling the pins and also increase the cross-sectional area of the relatively narrow pin portions which are straddled. The surfaces of these extensions which engage the slot walls are so shaped as to permit a slight overtravel when the pins are assembled. This will permit the workpiece-gripping outer end surfaces of the pins to adjust themselves to irregularities in the workpieces.

DESCRIPTION OF THE PREFERRED EMBODIMENT

Figures 1, 2, 3, 4, 5, 6:
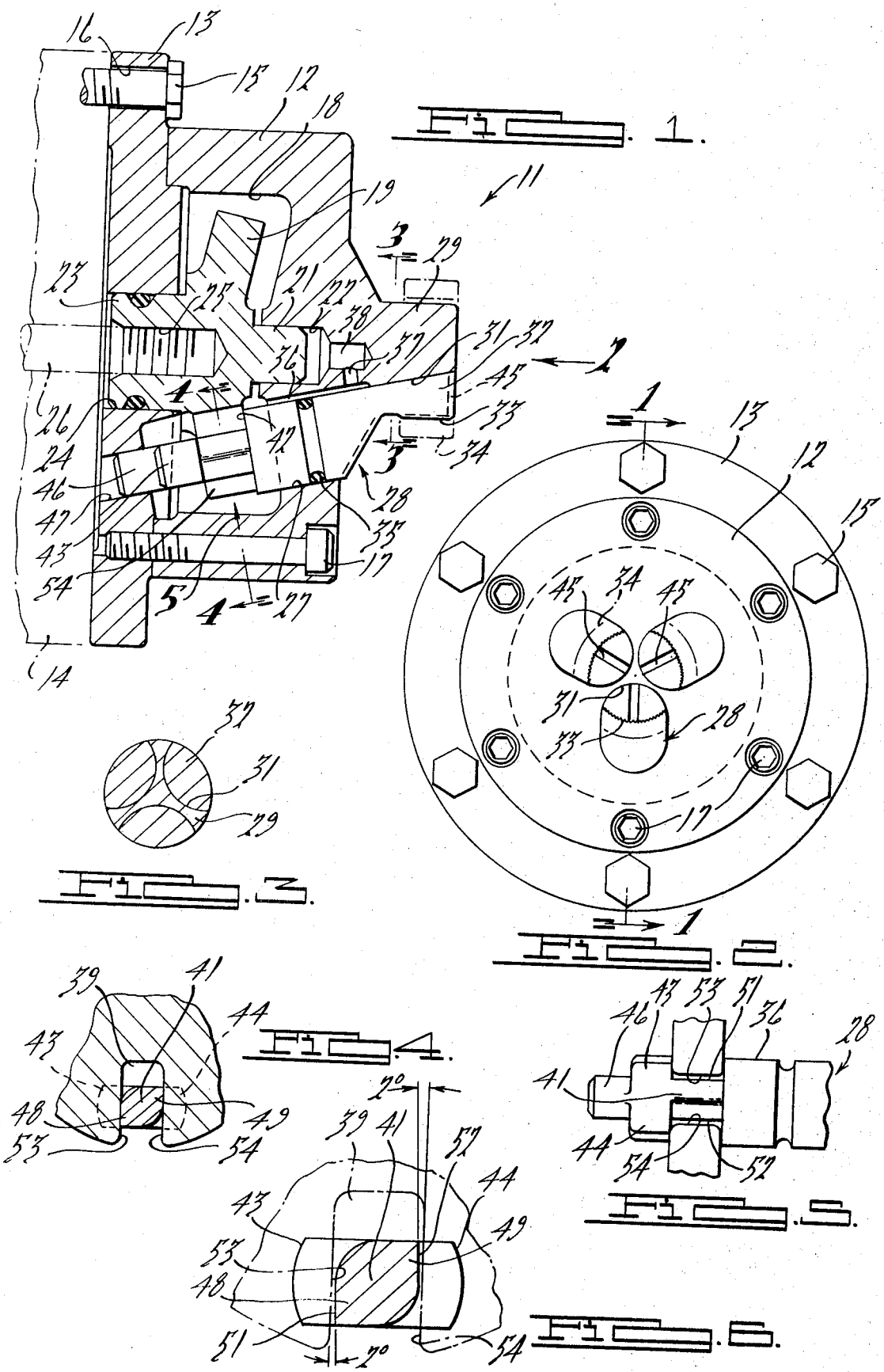
FIG. 1 is a side elevational view in cross-section taken along the line 1—1 of FIG. 2 and showing a preferred embodiment of the invention.
FIG. 2 is an end elevational view thereof taken in the direction of the arrow 2 of FIG. 1.
FIG. 3 is a fragmentary cross-sectional view taken along the line 3—3 of FIG. 1 and showing the supporting surfaces on the body for the pins.
FIG. 4 is a fragmentary cross-sectional view taken along the line 4—4 of FIG. 1 and showing engagement of the necked-down pin portions with the slot walls of the pin actuator.
FIG. 5 is a fragmentary elevational view taken in the direction of the arrow 5 of FIG. 1.
FIG. 6 is an enlarged fragmentary cross-sectional view of a portion of FIG. 4 showing the overtravel which permits the pin to float to accommodate workpiece irregularities.

The pin arbor is generally indicated at 11 and comprises a generally circular body 12 having a flange 13 mountable on a spindle shown partially in dot-dash lines at 14 by fasteners 15 passing through apertures 16 thereof. Body 12 is secured to flange 13 by bolts 17. The body has a cavity 18 which is partially filled with lubricant (not shown) and carries a disc-shaped pin actuator 19. One extension 21 of pin actuator 19 is guided by a central bore 22 in body 12 and another extension 23 slides in an aperture 24 of flange 13. Extension 23 has a threaded bore 25 for securing to a drawbar shown in phantom lines at 26. Drawbar 26 is capable of pulling pin actuator 19 to the left or pushing it to the right.

Body 12 has a plurality of inclined bores 27 within which slide pins generally indicated at 28. In the illustrated embodiment three such bores and pins are shown although the number may be varied to suit requirements. The outer portions of bores 27 are formed in an extension 29 of body 12 so that these portions are only partially formed with their arcuate surfaces 31 forming backups for the outer portions 32 of the pins. These outer pin portions are narrowed and have knurled or serrated arcuate gripping surfaces 33 engageable with the interior of a workpiece shown in dot-dash lines at 34.

The main portions of pins 28 carry seals 35 which keep the pins centered and seal cavity 18 against the entrance of grit, dirt or other foreign matter. Oil grooves 36 are provided in bores 27 for lubricating purposes. Passages 37 connect these grooves with a chamber 38 at the forward end of pin actuator 19 for the relief of pressure or partial vacuum which may build up in chamber 38 due to movement of actuator 19.

Actuator 19 has a plurality of radial slots 39 within which necked-down portions 41 of pins 28 are disposed. Each pin 28 presents a complete shoulder 42 on the forward side of slot 39 so that when the actuator 19 is moved to the right in FIG. 1 the pins will slide forwardly and inwardly. A pair of shoulders 43 and 44 are on the other side of slot 39 so that when the pin is in one rotative position these shoulders will be engageable by the leftwardly moving actuator 19 to move the pins outwardly and to the left. When in a 90° rotated position however shoulders 43 and 44 will be aligned with slot 39 so that the pin is removable by pulling it forwardly (to the right in FIG. 1). A screwdriver slot 45 or other means for applying a hand tool to the externally accessible portions of the pins may be provided. If desired, a pilot portion 46 may also be provided on the rearward end of each pin which will enter a bore 47 in flange 13. This will provide extra support and stability to the pins.

The necked-down portion 41 of each pin is of generally circular shape but has two tapered extensions 48 and 49 in opposite directions, so that each pin may only be rotated 90°. These extensions have surfaces 51 and 52 engageable with walls 53 and 54 respectively of slot 39 when the pin is assembled and rotated into its operative position. As shown in FIG. 6, surfaces 48 and 49 are slightly relieved so that workpiece-engaging surfaces 34 of the pins may adjust themselves to compensate for slight irregularities in the workpiece. In other words, surfaces 51 and 52 will engage walls 53 and 54 when the pin is rotated slightly past the point where gripping surfaces 34 are concentric with the arbor axis, thus allowing for chucking workpieces with a somewhat irregular surface. It should be observed that extensions 48 and 49 considerably increase the cross-sectional area of necked-down portions 41 of the pins, thus imparting extra tensile strength to them.

In operation, with actuator 19 moved to the right, workpiece 34 will be mounted on gripping surfaces 33 of the pins and actuator 19 moved to the left. During this movement the forces on the pins will be balanced with respect to the pin axes, thus minimizing any bending forces which might bend or break the pins. The increased cross-sectional areas of necked-down portions 41 will also minimize the possibility of breakage.

Should it be desired to replace pins 28 for any reason, such as to accommodate workpieces of a different size, it is only necessary to insert a screwdriver blade in each slot 45 and rotate the pin 90° until shoulders 43 and 44 are aligned with slot 39. This rotation would be counterclockwise in FIG. 4. The pins may then be withdrawn and replaced with different pins, the latter being rotated clockwise 90° to engage them with actuator 19.

We claim:

1. In a pin arbor, a body mountable on a spindle and having a cavity therein, a plurality of inclined bores in said body, a pin slidably mounted in each of said bores and having a central axis and an outer portion engageable with a workpiece, a pin actuator slidably supported within said cavity and connectable to a drawbar for reciprocating the actuator radially extending portions on said actuator engageable with portions on each of said pins, the engageable portions on said actuator and on each of said pins being perpendicular to said central axis and disposed, on opposite sides thereof, whereby when said actuator is moved and forces are applied to each pin by said actuator after the pins engage the work piece these forces will be balanced on opposite sides of the central axis of each pin so as to minimize bending forces on the pin, each of said pins being disengagable from said actuator by rotating some through a predetermined angle and being removable by axial withdrawal thereof, and means on externally accessible portions of said pins to which a hand tool can be applied for rotating said pins and thereby disconnecting the pins from the actuator and removing them from the body.

2. The combination according to claim 1, the engageable portions between each pin and said actuator comprising a necked-down portion on the pin and a radial slot on said actuator straddling said necked-down portion, and a pair of shoulders on one side of said slot, the pin being rotatable to align said shoulders with the slot for pin removal.

3. The combination according to claim 2, said necked-down portion being of generally circular shape but having a pair of opposite extensions with surfaces engageable with the slot walls in one rotative position of the pin.

4. The combination according to claim 3, said surfaces being relieved so as to engage the slot walls slightly past the point where the gripping surface on the pin is concentric with the arbor axis, whereby irregular workpiece surfaces will be accommodated.

5. The combination according to claim 1, said pins being inwardly inclined in a direction away from said actuator, the body having an extension with pin supporting surfaces.

6. The combination according to claim 1, said actuator having an extension guided in said body, a chamber between said body and extension and a passage connecting said chamber with said cavity to relieve pressure or partial vacuum therein.

7. The combination according to claim 6, said pins further having a pilot extensions on their inner ends slidable within bores of said body to provide additional stability and support for the pins.

8. In a pin arbor, a body having a cavity, an extension on its forward end and means on its rearward end mountable on a spindle, a plurality of circumferentially spaced inclined bores in said body, a plurality of pins slidably mounted in said bores, the outer ends of said pins having workpiece gripping surfaces, pin supporting surfaces on said extension, a disc-shaped pin actuator within said body, a plurality of radially extending slots on said actuator, necked-down portions on said pins disposed within said slots, opposite shoulders on the inner ends of said pins alignable with said slots when the pins are rotated to a withdrawing position, said necked-down portions being of generally circular shape but having extensions in opposite directions with surfaces engageable with the slot walls in an other rotative position of said pins, said surfaces being slightly relieved whereby the gripping surfaces of the pins may accommodate workpiece irregularities.

* * * * *